(12) United States Patent
Sato et al.

(10) Patent No.: US 6,631,554 B1
(45) Date of Patent: Oct. 14, 2003

(54) METHOD OF MANUFACTURING A WORKED-WIRE PRODUCT

(75) Inventors: Kazuhiro Sato, Kanuma (JP); Kiyonori Yokoi, Kanuma (JP); Takunori Watanabe, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 166 days.

(21) Appl. No.: 09/634,007

(22) Filed: Aug. 7, 2000

(30) Foreign Application Priority Data

Aug. 24, 1999 (JP) .......................... 11-236971

(51) Int. Cl.$^7$ .......................... H01B 13/20; B23P 23/00; H01R 43/04
(52) U.S. Cl. .......................... 29/828; 29/825; 29/564.4; 29/861; 174/88 C
(58) Field of Search .......................... 29/825, 283, 564.4, 29/861, 867, 827, 828, 564.3, 33 M, 331; 174/88 C, 88 R, 117 F

(56) References Cited

U.S. PATENT DOCUMENTS 3,909,911 A * 10/1975 Smith et al. .................. 29/867
4,268,957 A * 5/1981 Sbuelz ......................... 29/871
5,186,036 A * 2/1993 Kamada ....................... 29/861
5,189,786 A * 3/1993 Ishikawa et al. .............. 29/283
5,522,130 A * 6/1996 Wollermann .................. 29/825
6,326,549 B1 * 12/2001 Kunii et al. ................ 174/88 C
6,338,193 B2 * 1/2002 Kunii et al. ................... 29/825

FOREIGN PATENT DOCUMENTS

JP        10-144145    *  5/1998    ............ H01B/7/00

* cited by examiner

*Primary Examiner*—Carl J. Arbes
*Assistant Examiner*—Thiem D Phan
(74) *Attorney, Agent, or Firm*—Smith, Gambrell & Russell, LLP

(57) ABSTRACT

A method of manufacturing a worked-wire product from a wire (10) including, all coaxially arranged, a core conductor (11), an insulator (12), an outer conductor (13), a metal-evaporated film (14) and a sheath (15) is provided. The method comprises the steps of exposing a portion of the outer conductor (13); holding the exposed portion at two positions by gripping with metallic foils (2a; 2b) and fixtures (3; 4); bending the outer conductor (13) about a bending center (S) until it is circumferentially cut off, the bending being effected while applying ultrasonic vibrations on the outer conductor (13) through the fixture (4); removing the cut off portion of the outer conductor (13) to expose a portion of the insulator (12); and removing the exposed portion of the insulator (12) to expose a portion of the core conductor (11).

2 Claims, 4 Drawing Sheets

METHOD OF MANUFACTURING A WORKED-WIRE PRODUCT

BACKGROUND OF THE INVENTION

1. Field of the Invention

This invention generally relates to a method of manufacturing a worked-wire product, a manufacturing apparatus therefor, and a resultant worked-wire product.

2. Related Background Art

Recently, notebook-sized personal computers have increasingly commanded a considerable share of the computer market. In addition to that fact, so-called mobile computers are becoming pervasive as mobile communication terminals or gears. Thus, the computers are increasingly required to be made more compact and lightweight.

Furthermore, such as an operation speed in computers including the personal computers becomes more and more fast. This inevitably requires parts or elements of the computers to be more densely packed. Under such circumstances, not only flat or ribbon cables each comprising multiple core wires are favorably employed in the computers, but also flat cables are increasingly required to be installed in a limited space. Moreover, it becomes more earnestly desired to obtain matching of characteristic impedance at a higher accuracy than that heretofore possible.

In order to meet with such requirements, it has been required that during connecting operation of flat multi-core cable, the outer conductor of each wire comprising the associated cable is grounded certainly and the core conductor thereof be securely connected to connection points arrayed at a predetermined pitch in a connector terminal or a substrate.

Japanese Laid-Open Patent Publication No. 10-144145 discloses a worked-wire product in the form of a flat cable comprising a multiplicity of extra-fine core a wires and a method of manufacturing the same. According to this disclosed method, a length of each outer conductor is cut off by repetitions of mechanical bending thereof in order to expose the end of the associated core conductor, with the intention of effectively performing the cable connecting operation.

SUMMARY OF THE INVENTION

The inventors have applied themselves closely to the study of the above prior art. As a result, they have found that the prior art involves the following drawbacks, that is:

(1) Simultaneously with the repetitive bending of the outer conductors, the core conductors are also subject to a bending motion so that a bending induced deflection or strain (bending strain) may be progressively build up at the bend of the core conductor. In the case where the core conductor consists of a single wire, this may cause a so-called "thinned" area to be developed at the bend of the core conductor, resulting in a decrease in breaking force (load) of the core conductor thereat and an incomplete contact of the core conductor to a connector terminal, which in turn may eventually result in the break of the core conductor.

(2) In the case where the core conductor comprises a stranded wire or wires, some elementary wires forming the stranded wire may fray. As a result, a so-called "barb(s)" may appear. This disadvantageously affects work efficiency in connecting the raveled conductor to the connector terminal and so on. According to the circumstances, the incomplete contact of the core conductor to the connector terminal may be occur. This results that certain worked-wire products may be rejected on inspection, reducing yields.

It is to be noted that the term "thinned" used herein means such a condition that the size concerned reduces in diameter by e.g. 5% relative to that of a straight portion and may be subject to stress concentration. When the core conductor encounters such a reduction in diameter, its cross section may be decrease. Therefore, the core conductor is lessened in breaking force so that it becomes embrittled. It is to be noted that the term "barb" used herein represents an elementary wire projection, which separately extends from the end portion of other elementary wires comprising the stranded wire.

The present invention has been made in view of the above circumstances and has for its object to provide a method of manufacturing a worked-wire product, a manufacturing apparatus therefor, and a resultant worked-wire product, in which when a core conductor comprising wires is repeatedly bent to cause the end portion of the core conductor to be exposed, it is possible to prevent the occurrence of a decrease in core conductor strength and of broken core conductor.

The inventors have repeated diligent studies in order to achieve the above-mentioned object, and have found that, there is a close connection between wire bending modes and changes in mechanical strength of a core conductor at a bend, whereby the present invention is accomplished.

According to one aspect of the invention, a method of manufacturing a worked-wire product is provided, which comprises the steps of: providing a wire including a core conductor, an insulator surrounding the core conductor, an outer conductor surrounding the insulator, and a sheath surrounding the outer conductor; exposing a portion of the outer conductor; holding the exposed portion of the outer conductor at least at two positions by at least two holders; bending the outer conductor until it is circumferentially cut off, the bending being effected by a repeated bending motion (oscillating motion) of at least one of the holders about a bending center (or a fulcrum) present between adjacent holders while applying ultrasonic vibrations on the outer conductor through at least one of the holders; removing the cut off portion of said outer conductor to expose a portion of the insulator; and removing the exposed portion of the insulator to expose a portion of the core conductor.

According to such a method of manufacturing a worked-wire product, the ultrasonic vibrations applied on the outer conductor simultaneous with the bending thereof accelerate the deformation of the outer conductor at the bend thereof. This causes a crack or cracks to be easily created in the bend, so that the outer conductor can be readily cut off as compared with the prior art. It is assumed that the readiness of cut can be derived from interaction between the repeated bending and the fine and high-speed (i.e., short repetition cycle) mechanical movement of the bend of the outer conductor due to the ultrasonic vibrations.

Furthermore, the outer conductor can be readily and securely cut off, even if it is repeatedly bent at an angle smaller than that has been carried out in the prior art. Accordingly, it is possible to prevent the core conductor from being excessively bent, unfavorably resulting in the strain being stored in the core conductor. Thus, the occurrence of not only the "thinned" bend of the core conductor consisting of a single wire, but also the so-called "barb" in the stranded wire of the core conductor, which have been occurred in the prior art, can be considerably decreased.

Preferably, the bending of the outer conductor is effected so that the outer conductor is bent about the bending center (i.e., about an inflection point) at an angle of below 30°, more preferably 10° or less, from a longitudinal axis of the wire.

If the angle of bending reaches 30° or more, there occurs a clear tendency that a relatively large amount of strain is stored in the bend of the core conductor until the outer conductor is cut off. Thus, it is understood that, by setting the angle of bending below 30°, the occurrence of not only the "thinned" bend of the core conductor, but also the so-called "barb" in the core conductor comprising the stranded wire, which have been occurred in the prior art, can be further decreased.

Furthermore, if the angle of bending is set to 10° or less, the occurrence of such "thinner" bend and "barb" can be prevented more effectively. As stated above, with the method of manufacturing the worked-wire product according to the invention, the outer conductor is bent while being subject to the ultrasonic vibrations so that the outer conductor alone can be readily cut as compared with the prior art. Thus, if the angle of bending is set below 30°, it is possible to shorten a period of time necessary to cut off the outer conductor as compared with the prior art. As a result, an improvement in workability can be realized.

According to another aspect of the invention, a manufacturing apparatus for advantageously embodying the method of manufacturing a worked-wire product according to the invention is provided. The apparatus manufactures the worked-wire product from a wire including a core conductor, an insulator surrounding the core conductor, an outer conductor surrounding the insulator, and a sheath surrounding the outer conductor. The apparatus comprises at least two holders holding an exposed portion of the outer conductor at least at two positions, respectively; and a vibration exciter applying ultrasonic vibrations on the outer conductor through at least one of the holders.

It is preferable that the apparatus further comprises a device for bending the outer conductor through a repeated bending (oscillating) motion of at least one of the holders about or around a bending center present between adjacent holders, i.e., about the bending center as a center point of rotatory motion of the holder(s).

According to further aspect of the invention, a worked-wire product is provided, which includes a core conductor, an insulator surrounding the core conductor, an outer conductor surrounding the insulator, and a sheath surrounding the outer conductor, the core conductor being partially exposed using a manufacturing method according to the present invention.

It is understood that ultrasonic waves available in the present invention are sonic or acoustic waves including elastic waves having a frequency of 20 kHz or more. The frequency and/or intensity may be constant or changed regularly or irregularly. The ultrasonic wave may include a frequency component within an audio-frequency range.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
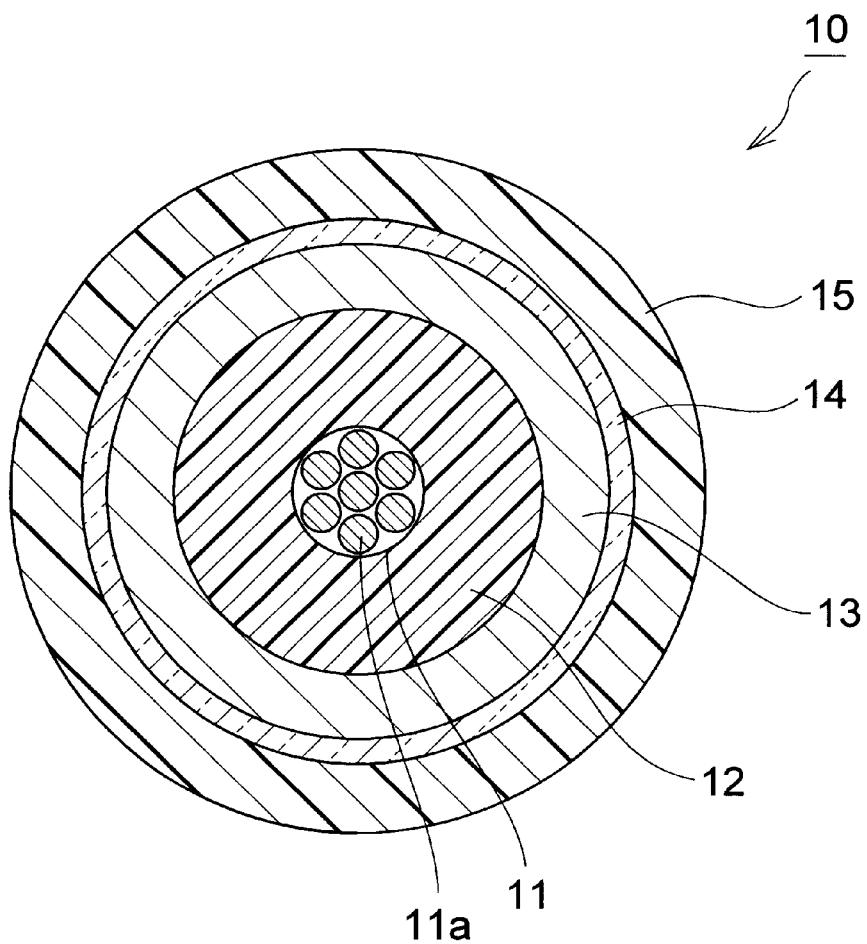
FIG. 1 shows a cross section through one embodiment of a cable or wire used for manufacturing a worked-wire product according to the present invention.

The present invention will be explained in detail hereinafter in conjunction with the preferred embodiments thereof shown by way of example only in the accompany drawings, in which the same or similar members are labeled with the same reference numeral throughout the drawings in order to avoid redundancies.

FIG. 1 is a cross section of one embodiment of a cable or wire used for producing a worked-wire product according to the present invention. In FIG. 1, a reference numeral 10 generally represents a wire comprising a core conductor 11 formed by twisting a plurality of elementary wires 11a into one, a substantially tubular insulating member 12 surrounding the core conductor 11, and an outer conductor 13 surrounding the insulating member 12, these members 11 to 13 being arranged coaxial. The coaxial wire 10 further comprises a metal-evaporated film 14 in the form of a tape wound around the outer conductor 13, and a sheath 15 surrounding the metal-evaporated film 14.

Figure 3:
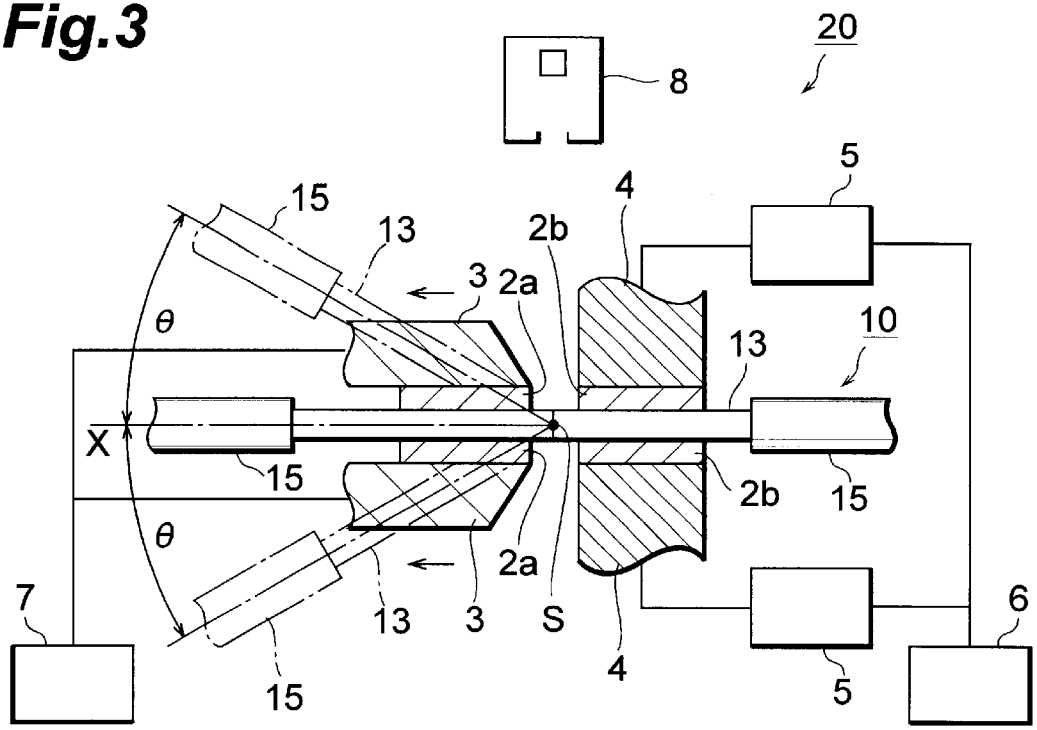
FIG. 3 is a side elevation of one embodiment of a worked-wire product manufacturing apparatus according to the present invention, explaining steps of manufacturing the worked-wire product according to the manufacturing method of the present invention.

FIG. 3 is a diagrammatic view showing, partially in section, a side elevation of one embodiment of an apparatus for manufacturing the worked-wire product in accordance with the present invention. As generally shown at 20 in FIG. 3, the manufacturing apparatus includes a laser unit 8 for emitting a laser beam toward the sheath 15 of the wires 10 to form slits (not shown) in the sheaths 15 and the metal-evaporated films 14, and a pair of metallic foil means 2a and 2b for gripping the exposed portion of the outer conductor 13 at least at two longitudinally spaced positions. The foils of the metallic foil means 2a and 2b are sandwiched by respective fixtures 3 and 4 to hold the outer conductor 13. Thus, it is understood that either of the combinations of the foil means 2a and the fixture 3; and the foil means 2b and the fixture 4 forms a holder. As will be described hereinafter, a slit can also be formed in each insulating member 12 by emitting the laser beam toward it from the laser unit 8.

The fixture 3 is associated with a drive 7 connected to a power supply (not shown) for bending the wire 10 in a hereinafter defined manner. The drive 7 causes the holder comprising the metallic foil means 2a and the fixture 3 to be bent (oscillated) at an angle of θ from a longitudinal axis X of the wire 10 about a bending center S present between the holders. It is pointed out that the drive 7 may also drive the fixture 3 in the direction shown in FIG. 3 by the arrow along the axis X.

The fixture 4 is acoustically connected to an oscillator 5 including therein a piezoelectric element (not shown), which generates an ultrasonic wave in a known manner. The oscillator 5 is connected to a power circuit 6, which applies to the oscillator 5 a voltage sufficient to cause the piezoelectric element An therein to vibrate at an ultrasonic frequency, propagating ultrasonic waves. The power circuit 6 is connected to a not shown power source. Thus, the aforesaid oscillator 5, power circuit 6 and power source cooperate with each other to form a vibration exciter. The ultrasonic vibration created by the oscillator 5 propagates through the fixture 4 and the foils 2b into the outer conductor 13.

A method of manufacturing a worked-wire product, including a plurality of wires 10 shown in FIG. 1, by using the manufacturing apparatus 20 will be explained in detail in conjunction with FIGS. 2 to 5, which diagrammatically illustrate the procedures of the manufacturing operation according to the present invention.

Figure 2:
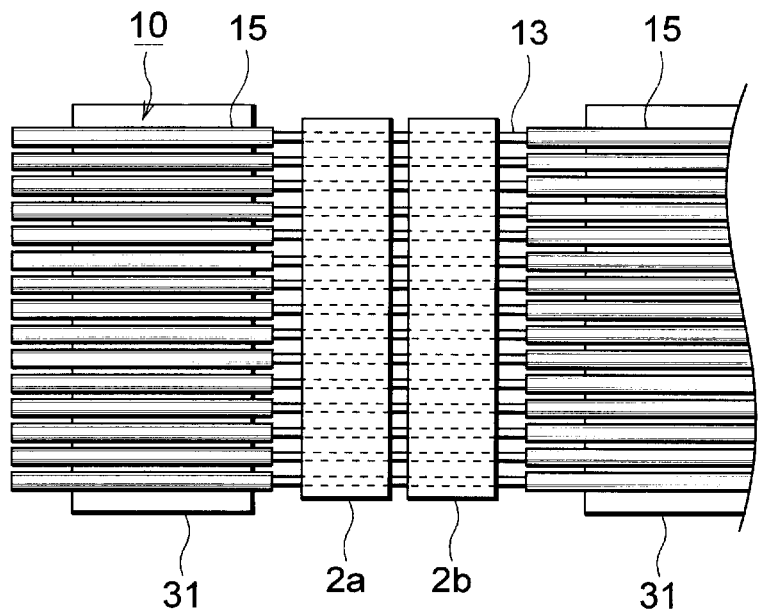
FIG. 2 is a diagrammatic plan view for explaining steps of manufacturing the worked-wire product according to a manufacturing method of the present invention.

(1) First, as shown in FIG. 2, a plurality of wires 10 is securely disposed on a pair of spaced adhesive tapes 31 so that they extend in parallel at a predetermined pitch. The laser unit 8 irradiates a laser beam traversing the array of wires 10 so that the sheath 15 and metal-evaporated film 14 of each wire 10 are formed with the slits (not shown) at portions thereof adjacent to the end of the respective wire 10. Thereafter, the slit-formed end portions, i.e., sheath ends 15 and metal-evaporated film ends 14, of the wires 10 are forced away from the remaining portions thereof, together with the left-side adhesive tape 31 attached thereto, causing the outer conductors 13 to be partially exposed (e.g., see Japanese Laid-Open Patent Publication No. 10-144145).

(2) Then, the exposed portions of the outer conductors 13 are sandwiched in a lump, as shown in FIG. 2, by each of the metallic foil means 2a and 2b. The foil means 2a and 2b are fixedly attached to the outer conductors 13 by any suitable means, such as welding or soldering. The whole foil means 2a and 2b are in turn sandwiched by the respective fixtures 3 and 4. In this manner, the outer conductors 13 are securely held in position.

(3) A voltage is applied through the power circuit 6 to the oscillator 5 shown in FIG. 3 to cause the oscillator 5 to generate the ultrasonic waves. The generated ultrasonic waves propagate through the fixture 4 and the metallic foils 2b into the outer conductors 13. Thus, the outer conductors 13 are ultrasonically vibrated especially at the portions thereof near the metallic foils 2b. Under the condition that the outer conductors 13 are being ultrasonically vibrated, the drive 7 is activated to oscillate the fixture 3 in such a manner that the angle θ shown in FIG. 3 (an angle with respect to the longitudinal axis of each wire at which each outer conductor is bent about the bending center S) is maintained below 30°, preferably 10° or less. Thus, each outer conductor 13 is repeatedly bent about the bending center S.

As a result of repeated bendings, a crack appears in the bend of each outer conductor 13 adjacent to the bending center S and expands along the periphery of each outer conductor 13. Eventually, the outer conductor 13 is cut at the cracked portion thereof. It is understood that any suitable frequency and intensity of ultrasonic waves can be utilized for carrying out the invention. However, it is preferable that a frequency is within a range of 20 to 28 MHz, more preferably 24 to 28 MHz and an output of the oscillator 5 is within a range of 31 to 45 W, more preferably 38 to 40 W depending on materials, outer diameters, strength and the like of the outer conductor 13 and/or the core conductor 11.

(4) After the cut of the outer conductors 13, the voltage supply to the oscillator 5 is turned off to cease the generation of the ultrasonic waves. The drive 7 is also made inoperative to cease the repeated oscillations of the fixture 3. Subsequently, the drive 7 is again operated to move the fixture 3 and the outer conductors 13 in a lump in the direction along the longitudinal axis X away from the fixture 4. As a result, the end portion of each outer conductor 13 (a portion on the end side with respect to the cut position) is removed from the remaining portion and the end portion of each insulating member 12 (a portion on the free end side thereof) can be exposed.

Figure 4:
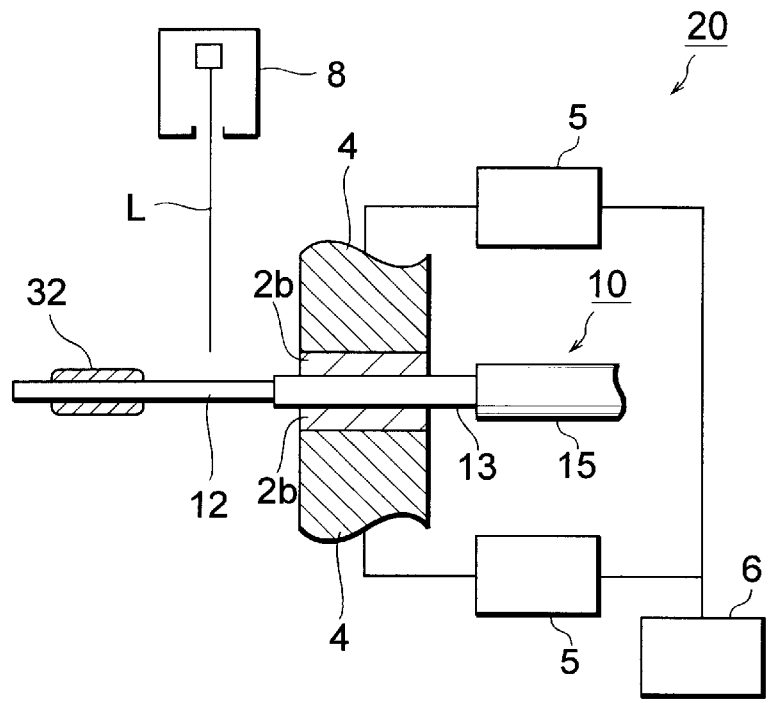
FIG. 4 is a diagrammatic side elevation for explaining steps of manufacturing the worked-wire product according to the manufacturing method of the present invention.

(5) Subsequently, as shown in FIG. 4, a plastic tape 32 is partially wound around the exposed end portions of the insulating members 12 and secured thereto by means of thermal adhesion. Thus, the pitch, at which the insulating members 12 of the wires 10 are arranged, can be fixed. Under such conditions, the laser unit 8 traverses across the array of cables 10 while irradiating the predetermined area of each insulating member 12 with the laser beam L in order to form a slit in each area. This area is present between the wound plastic tape 32 and the fixture 4. Then, the end portion of each insulating member 12 (the portion on the end side with respect to the slit area) is displaced along the axial direction X away from the fixtures 4 until the end portion of the core conductor 11 is exposed. Thereafter, each exposed conductor 11 is cut at a predetermined position. In this manner, a flat cable (worked-wire product) 1 can be obtained.

According to such a method of manufacturing a worked-wire product, the ultrasonic vibrations applied on each outer conductor 13 accelerate the deflection or deformation of the outer conductor 13 at the bend thereof. Thus, each outer conductor 13 can be readily cut off, even if it is repeatedly swung at an angle smaller than that employed in the prior art. It is assumed that the readiness of cut can be derived from interaction between the repeated bending and the fine and high-speed (i.e., short repetition cycle) mechanical movement of the bend of each outer conductor 13 due to the ultrasonic vibrations.

As will be understood from the foregoing, as the outer conductor 13 can be readily cut, even if it is repeatedly bent at an angle smaller than that in prior art, it is possible to prevent the core conductor 11 from being excessively bent, undesirably resulting in the strain being stored in the conductor 11. Accordingly, the occurrence of so-called "barb" in the core conductor 11 comprising the stranded wire can be considerably decreased. As a result, it is also possible to effectively prevent the core conductor 11 from being decreased in strength at the bend and from being broken. This improves manufacturing yields of the worked-wire products. Furthermore, as the core conductor 11 is prevented from storing the strain therein, it is possible to prevent the core conductor 11 from being made "thin" even when the core conductor 11 consists of a single wire.

As described above, the outer conductor is bent about the bending center (inflection point) S at an angle of θ from the longitudinal axis of the wire 10, the angle θ being set below 30°, preferably to 10° or less. It is possible to effectively prevent the strain from being stored in the bend of the core conductor 11, which has been noticeably generated in the case where the bending angle is set to 30° or more. As a result, the occurrence of so-called "barb" in the core conductor 11 can be further decreased, so that it is possible to effectively prevent the core conductor 11 from being decreased in strength at the bend and from being broken. Furthermore, it is also possible to prevent the core conductor 11 from being made "thin" even when the core conductor 11 consists of a single wire.

As the bending angle θ can be diminished, it is possible to shorten a period of time necessary to cut off the outer conductors 13, resulting in an improvement in workability. Accordingly, increased productivity of the worked-wire products can be realized.

Figure 6:
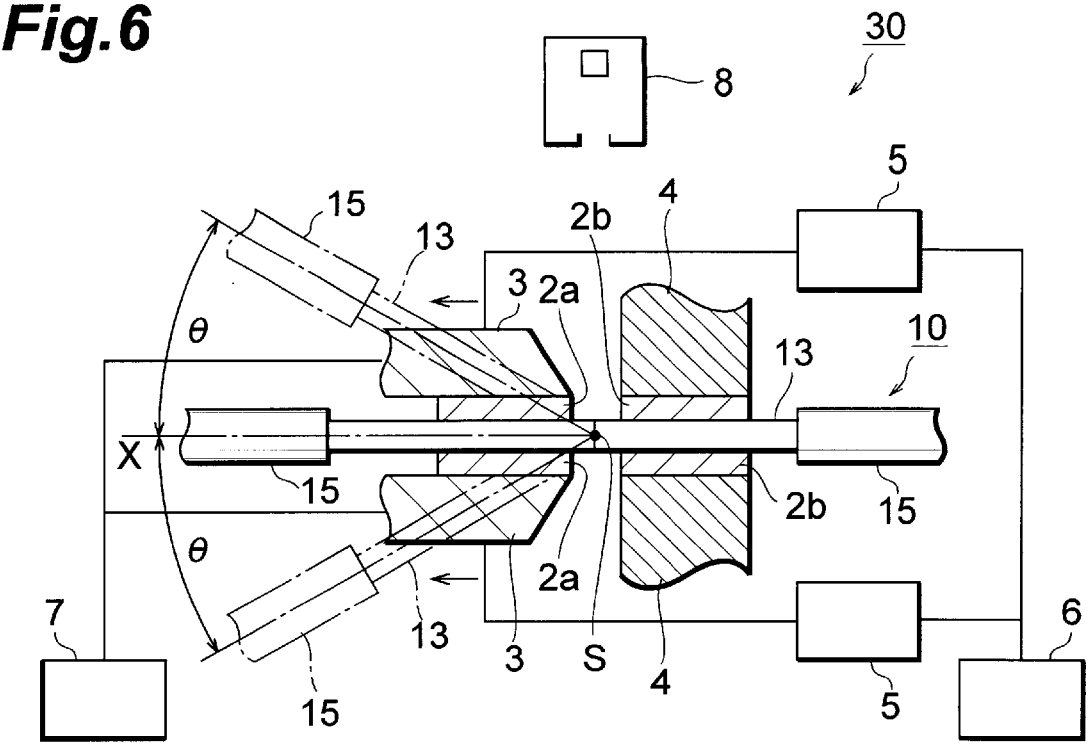
FIGS. 6 and 7 are side elevations of different embodiments of a worked-wire product manufacturing apparatus according to the present invention.

FIG. 6 is a diagrammatic view showing, partially in section, a side elevation of another embodiment of an apparatus 30 for manufacturing the worked-wire product in accordance with the invention. As will be understood from FIG. 6, the manufacturing apparatus 30 has the same construction as that of the manufacturing apparatus 20 shown in FIG. 3, except that the oscillator 5 is connected to the fixture 3 instead of the fixture 4.

With this manufacturing apparatus 30, when the outer conductor 13 is repeatedly bent about the bending center S, a crack(s) creates near the bending center S and eventually, the outer conductor 13 is cut circumferentially. During the bending of the outer conductors 13, the ultrasonic vibrations applied thereon accelerate the deflection or deformation of each outer conductor 13 at the bend thereof. Thus, each outer conductor 13 can be readily cut off, even if it is repeatedly bent (oscillated) at an angle smaller than that employed in the prior art.

Figure 7:
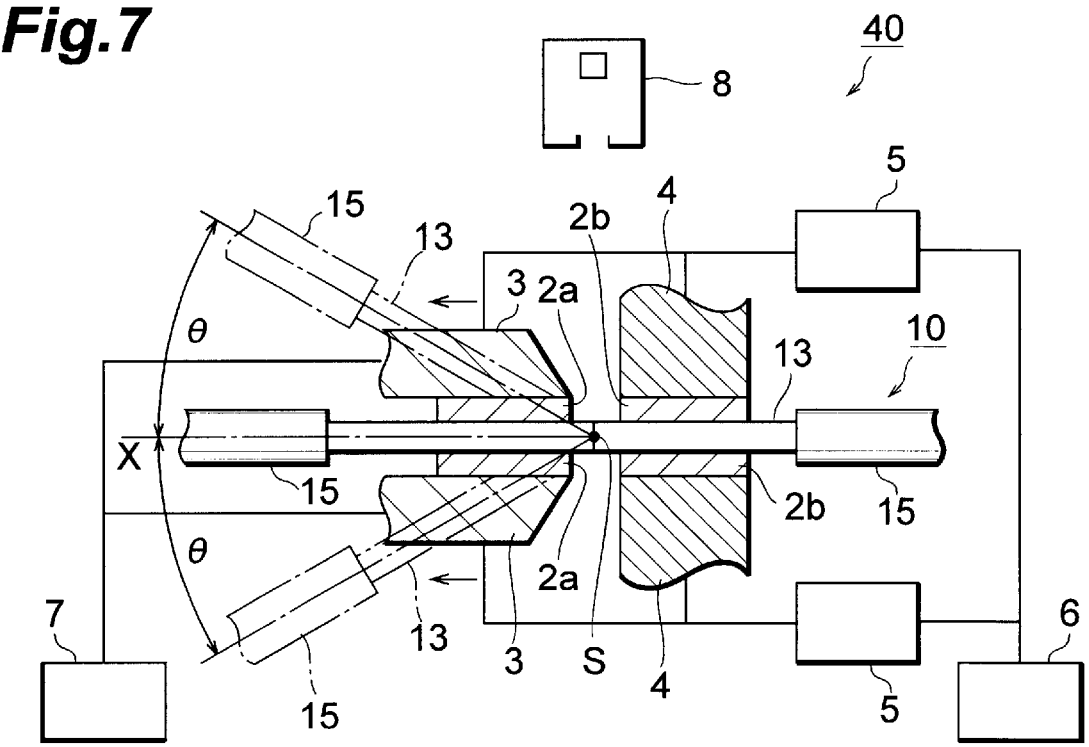

FIG. 7 is a diagrammatic view showing, partially in section, a side elevation of further embodiment of an apparatus 40 for manufacturing the worked-wire product in accordance with the invention. As will be understood from FIG. 7, the manufacturing apparatus 40 has the same construction as that of the manufacturing apparatus 20 shown in FIG. 3, except that the oscillator 5 is acoustically connected to either of the fixtures 3 and 4.

In this manufacturing apparatus 40, while the outer conductors 13 are being subject to the bending, the ultrasonic vibrations are applied thereon. This accelerates the deflection or deformation of each outer conductor 13 at the bend thereof. Thus, each outer conductor 13 can be readily cut off, even if it is repeatedly bent (oscillated) at an angle smaller than that employed in the prior art. Although the single oscillator 5 is connected to both of the fixtures 3 and 4 in this embodiment, separate oscillators may be connected to the fixtures 3 and 4, respectively.

It is noted that the pressing forces applied on the outer conductors 13 through the metallic foil means 2a and 2b by the fixtures 3 and 4 are so selected that excessive pressures are not applied on the sides of the outer conductors 13 as well as the core conductors 11.

It is also noted that any suitable material may be utilized to form the fixture 4 unless the propagation of ultrasonic waves is inhibited. The holder is not limited to the combination of a fixture and foil means. The array of conductors may be held by any suitable means, such as other clamps (a combination of upper and lower fixtures may be involved in the concept of a clamp), plate means capable of being bonded to the outer conductors by an adhesive (e.g., pressure sensitive adhesive), or any suitable nipping or holding tools, e.g., spanner, wrench, pliers, and vise.

Furthermore, the oscillator 5 is not limited to the piezoelectric element type and any suitable elements known in the art may be employed, provided that they can create ultrasonic waves. For example, a lead zirconate titanate (PZT) element may be employed. Preferably, piezoelectric ceramics may be used as a piezoelectric element. The vibration exciter may be of any suitable type including such an oscillator.

In order to scan the surface of the sheath 15 by the laser beam, the laser unit 8 may include a laser beam scanning mechanism, such as a PZT mirror. In this case, the wire 10 is maintained stationary and an angle of laser beam irradiation is varied. However, a direction of laser beam irradiation may be fixed and the wire 10 may be straight driven. Alternatively, the laser unit 8 may include an optical-fiber cable provided at its free end with an irradiation probe. The laser beam may be irradiated, while the irradiation probe moves in a programmed manner.

Figure 5:
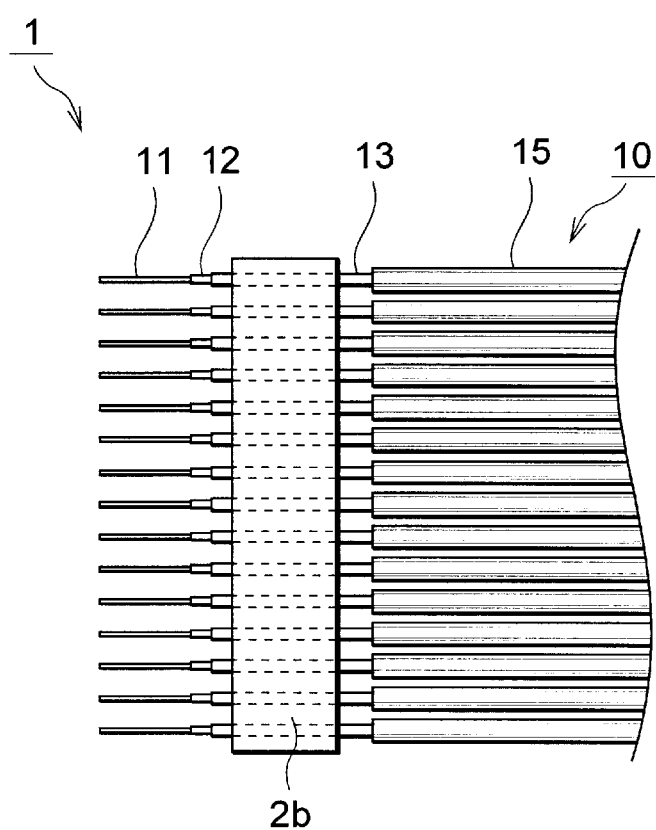
FIG. 5 is a diagrammatic plan view of the worked-wire product of the invention, explaining steps of manufacturing the worked-wire product according to the manufacturing method of the present invention.

Preferably, in order to enhance workability in connecting the core conductor 11 to a connector, the flat cable 1 shown in FIG. 5 may be dipped in molten solder so that a tip of each core conductor 11 is coated with the solder.

Although the worked-wire product according to the present invention has been explained in conjunction with the flat cable 1 comprising a plurality of wires 10, the manufacturing method according to the present invention may be applied to the manufacture of a worked-wire product including a single wire 10. That is, the worked-wire product may comprise one or more wires.

The core conductor 11 of the wire 10 may be a single wire, but not the stranded wires. The sheath 15 and/or the metal-evaporated film 14 may not be necessarily provided for the wire 10. If not provided, the step of exposing the outer conductor 13 may be omitted. The step of exposing the outer conductor 13 may also be omitted, in the case where a wire, a portion of which is preliminarily exposed, is employed as a material for the worked-wire product.

The manufacturing apparatus 20 may be provided with means for displacing the cut sheaths 15 and metal-evaporated films 14 of the cables 10 in a lump, and/or, means for pulling out the cut insulating member 12. More specifically, the displacing and pulling out means may comprise, for example, holders for sandwiching and holding the cut sheaths 15 and metal-evaporated films 14 and the cut insulating members 12, and drives for moving the holders along the longitudinal axis X of the wire 10.

The manufacturing apparatus 20 may not be necessarily provided with the drive 7. If not provided, the end portion of each outer conductor 13 may be repeatedly bent by hands. After being cut, the cut end portion thereof may be displaced by hands to be removed from the remaining portion of the outer conductor 13.

The removal of the cut end portion of the insulating member 12 may be performed by gripping the end portion of the insulating member 12 by the fixture 3 and displacing the fixture 3 gripped the end portion by the drive 7. The outer conductor 13 may be held at two or more locations. Needless to say, in this case, two or more fixtures may be employed.

EXAMPLES

In the following, the present invention is specifically explained with reference to Examples, which do not restrict the present invention as long as the latter does not deviate from the gist thereof.

Example 1

(1) The core conductor 11 was a 7-ply strand cable comprising seven elementary wires 11a each consisting of a tin-plated copper alloy wire of a 0.03-mm diameter. The insulating member 12 fitted onto the core conductor 11 was made of fluoropolymers having a radial thickness of 0.06 mm. A tin-plated copper alloy wire having a diameter of 0.03 mm was spiral wound around the insulating member 12 to form the outer conductor 13 as a so-called spiral shield. Then, a copper-evaporated polyester tape was wound around the outer conductor 13 with the copper-evaporated surface thereof facing toward inside to form the metal-evaporated film 14, which was covered with a polyester tape forming the sheath 15. In this manner, an extra-fine coaxial cable (wire 10) having an outer diameter of 0.33 mm was produced. Twelve coaxial cables were placed in parallel at a pitch of 0.5 mm and adhesive tapes 31 (see FIG. 2) were attached to the opposite sides of these coaxial cables in order to fix the pitch at 0.5 mm.

(2) The fixed coaxial cables in the form of a tape were cut to a length of 180 cm. Thereafter, a laser beam L was irradiated toward the tape at a distance of 15 mm from each end thereof to form slits or grooves in the sheaths 15 and copper-evaporated polyester tapes of the coaxial cables. After the slits have been formed, the adhesive tapes 31, sheaths 15 and copper-evaporated polyester tapes were displaced in a rump to partially expose the outer conductors 13. Two axially spaced areas of the exposed portion of each outer conductor 13 were sandwiched between tin-plated gland bars (metallic foils 2a, 2b) made of phosphor bronze each having a width of 1 mm and a thickness of 0.5 mm. The gland bars were fixedly soldered to the outer conductors 13 as shown in FIG. 2. Furthermore, the upper and lower gland bars were gripped by the fixtures 3 and 4 as shown in FIG. 3 to securely hold the outer conductors 13.

(3) Under such conditions, the oscillator 5 with a piezo-electric element was operated to generate 40-watt ultrasonic waves at a frequency of 26 MHz to apply ultrasonic vibrations on the outer conductors 13 through the fixtures 4 and the gland bars. While the ultrasonic vibrations were being applied, the fixtures 3 and accordingly the outer conductors 13 were bent (oscillated) up and down about the bending center present at about the midpoint position between the left-hand and right-hand gland bars until the outer conductors 13 were cut. The maximum angle θ of bending was 10°. Then, the cut end portions of the outer conductors 13 were removed as a whole to cause the end portions of the insulating members 12 to be exposed as shown in FIG. 4.

(4) Then, without changing the pitch of the insulating members 12, an insulating film (plastic tape 32) was thermally adhered to the insulating members 12 as shown in FIG. 4 to fix the pitch of the insulating members 12. After the laser beam L has formed slits in the portions of the insulating members 12 at between the insulating film and the residual gland bars, the end portions of the insulating members 12 on the side of the insulating film were pulled out by displacing them away from the outer conductors 13 so that the core conductors 11 are exposed. Then, the exposed conductors 11 were cut at a predetermined position so as to have the same length. As a result, a flat cable assembly 1 as a worked-wire product could be obtained.

In this manner, 3,000 flat cable assemblies 1 have been manufactured. Among them, defective products, such as a flat cable assembly in which some elementary wires composing the core conductor have "barb(s)", or a flat cable assembly including a "thinned" core conductor 11, were only seven (7 cables). That is, a percentage defective was extremely low 0.23% and production yield was about 100%. The mean number of times, that the outer conductor 13 was repeatedly bent until it was cut off, was about 3 (3 repetitions), which was no problem for the actual manufacturing operation.

Here, it is preferred that above-mentioned "the mean number of times" is fewer. In the case, an influence on the core conductor becomes less. Further, above-mentioned "a percentage defective" indicates the percentage of the number of defective items, in such inspections as continuity test and visual inspection, to the total number of the flat cable assemblies connected to connectors; ditto for the following.

Example 2

3,000 flat cable assemblies have been manufactured in the same manner as in Example 1, except that the angle of bending was 25° and evaluations of a percentage defective have been, performed as in Example 1. As a result, although the percentage defective was slightly increased to 0.6%, this value was still satisfactory. The mean number of times, that the outer conductor was repeatedly bent until it was cut off, was 1.5. This results in decrease of man-hours as compared with Example 1.

The usefulness of the present invention will be understood from the results of above-discussed Examples 1 and 2, if comparisons are made with the following results of comparative examples 1 and 2.

Comparative Example 1

3,000 flat cable assemblies have been manufactured in the same manner as in Example 1, except that the angle θ of bending was 35° and no ultrasonic waves were applied on the outer conductors. Evaluations of a percentage defective have been performed as in Example 1. As a result, it was found that the mean number of times, that the outer conductor was repeatedly bent until it was cut off, was increased beyond 7. Also, "barb" and/or "thinned" conductors generated frequently and therefore a percentage defective was increased above 4%. Thus, it is understood that the results are unsuitable in view of not only operating efficiency, but also manufacturing efficiency.

Comparative Example 2

3,000 flat cable assemblies have been manufactured in the same manner as in Example 1, except that the angle θ of bending was 10° and no ultrasonic waves were applied on the outer conductors. Evaluations of a percentage defective have been performed as in Example 1. As a result, it was found that the mean number of times, that the outer conductor was repeatedly bent until it was cut off, was increased beyond 10 times. Because such a rather large number of bending times caused elementary wires to behave unfavorably, "barb(s)" and/or "thinned" conductors generated frequently. Thus, a percentage defective was increased above 15%.

It is understood from the foregoing that in a method of manufacturing wire products, a wire product manufacturing apparatus and resultant wire products realized according to the present invention, outer conductors are bent until they are cut out while being subject to irradiation of ultrasonic waves, so that the outer conductors can be readily cut off even when the bending angle is set to a lower value. This enables the bending angle to be greatly decreased, resulting in sufficient prevention of a buildup of strain occurring in the bend of each core conductor. Accordingly, when the core conductors comprising wires are repeatedly bent to cause the end portion of each core conductor to be exposed from the associated insulator, it is possible to prevent the occurrence of a decrease in strength of core conductors and of broken core conductors.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a worked-wire product, comprising the steps of:

providing a wire including a core conductor, an insulator surrounding the core conductor, an outer conductor surrounding the insulator, and a sheath surrounding the outer conductor;

exposing a portion of said outer conductor;

holding the exposed portion of said outer conductor at least at two positions by at least two adjacent holders;

bending said outer conductor until said outer conductor is circumferentially cut off, the bending being effected by a repeated bending motion of at least one of said holders about a bending center present between the adjacent holders while applying ultrasonic vibrations on said outer conductor through at least one of the holders;

removing the cut off portion of said outer conductor to expose a portion of said insulator; and removing the exposed portion of said insulator to expose a portion of said core conductor.

2. A method of manufacturing a worked-wire product according to claim 1, wherein said step of bending said outer conductor is effected so that the outer conductor is bent at an angle of below 30° from a longitudinal axis of said wire.

* * * * *